United States Patent
Hessler et al.

(10) Patent No.: US 9,867,195 B2
(45) Date of Patent: Jan. 9, 2018

(54) METHODS AND NETWORK NODES FOR PERFORMING A JOINT RECEPTION IN A CELLULAR RADIO COMMUNICATION NETWORK

(71) Applicant: TELEFONAKTIEBOLAGET L M ERICSSON (PUBL), Stockholm (SE)

(72) Inventors: Martin Hessler, Linköping (SE); Jonas Fröberg Olsson, Ljungsbro (SE); Peter Nauclér, Knivsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 150 days.

(21) Appl. No.: 14/769,333

(22) PCT Filed: Mar. 4, 2013

(86) PCT No.: PCT/EP2013/054260
§ 371 (c)(1),
(2) Date: Aug. 20, 2015

(87) PCT Pub. No.: WO2014/135186
PCT Pub. Date: Sep. 12, 2014

(65) Prior Publication Data
US 2016/0007337 A1 Jan. 7, 2016

(51) Int. Cl.
*H04W 72/04* (2009.01)
*H04B 7/024* (2017.01)
(Continued)

(52) U.S. Cl.
CPC .......... *H04W 72/048* (2013.01); *H04B 7/024* (2013.01); *H04L 5/006* (2013.01);
(Continued)

(58) Field of Classification Search
None
See application file for complete search history.

(56) References Cited

U.S. PATENT DOCUMENTS

| 2011/0080879 A1 | 4/2011 | Grant |
| 2013/0083681 A1* | 4/2013 | Ebrahimi Tazeh Mahalleh .............. H04L 5/0057 370/252 |

(Continued)

FOREIGN PATENT DOCUMENTS

WO 2014062104 A1 4/2014

OTHER PUBLICATIONS

Korean Office Action dated Mar. 7, 2017, issued in Korean Patent Application No. 10-2015-7025802, 7 pages.*

(Continued)

*Primary Examiner* — Diane Lo
(74) *Attorney, Agent, or Firm* — Rothwell, Figg, Ernst & Manbeck, P.C.

(57) ABSTRACT

The disclosure relates to cellular radio communication systems, and especially to performing a joint reception of uplink transmissions from user equipment devices UE1, UE2. A serving node and a cooperating node is described together with methods performed by each node. The serving node comprises a user equipment selector, a cooperating node selector and a radio element selector. The serving node also includes a user equipment allocator, a joint reception requester configured to order joint reception data from selected cooperating nodes, and a backhaul capacity obtainer configured to obtain a backhaul capacity of selected cooperating nodes. Especially, the radio element selector is adapted to select radio resource elements based on a determined backhaul capacity. By considering the backhaul capacity, the backhaul can be employed for joint reception without becoming overloaded. The cooperating node especially includes an element prioritizing unit configured to prioritize between data obtained from different the radio resource elements.

20 Claims, 8 Drawing Sheets

(51) Int. Cl.
H04L 5/00 (2006.01)
H04L 29/06 (2006.01)
H04W 72/10 (2009.01)

(52) U.S. Cl.
CPC ....... *H04L 5/0035* (2013.01); *H04W 72/0486* (2013.01); *H04L 69/14* (2013.01); *H04W 72/0426* (2013.01); *H04W 72/10* (2013.01)

(56) References Cited

U.S. PATENT DOCUMENTS

| | | | | |
|---|---|---|---|---|
| 2014/0106802 | A1* | 4/2014 | Cheng | H04W 72/12 455/509 |
| 2014/0192740 | A1* | 7/2014 | Ekpenyong | H04L 5/0035 370/329 |
| 2015/0358959 | A1* | 12/2015 | Meshkati | H04W 72/0413 370/329 |

OTHER PUBLICATIONS

Mexican Office Action dated Nov. 9, 2016, issued in Mexican Patent Application No. MX/a/2015/010291, 4 pages.
Notification of Transmittal of the International Search Report and Written Opinion dated Nov. 21, 2013, in International Application No. PCT/EP2013/054260, 13 pages.
Fabian Diehm et al: "On the impact of signaling delays on the performance of centralized scheduling for joint detection cooperative cellular systems", Wireless Communications and Networking Conference (WCNC), 2011 IEEE, IEEE, Mar. 28, 2011 (Mar. 28, 2011), pp. 1897-1902, XP031876543, DOI: 10.1109/WCNC.2011. 5779423 ISBN: 978-1-61284-255-4.
CATT: "The Scheduling Priority in CoMP", 3GPP Draft; R2-095490, 3rd Generation Partnership Project (3GPP), Mobile Competence Centre ; 650, Route Des Lucioles ; F-06921 Sophia-Antipolis Cedex ; France, No. Miyazaki; Oct. 12, 2009, Oct. 16, 2009 (Oct. 16, 2009), XP050390046, [retrieved on Oct. 4, 2009], 3 pages.
Frank P et al: "Cooperative interference-aware joint scheduling for the 3GPP LTE uplink", Personal Indoor and Mobile Radio Communications (PIMRC), 2010 IEEE 21st International Symposium on, IEEE, Piscataway, NJ, USA, Sep. 26, 2010 (Sep. 26, 2010), pp. 2216-2221, XP031837949, ISBN: 978-1-4244-8017-3.
Texas Instruments: "Timing Advance in support of UL CoMP", 3GPP Draft; R1-113789 Timing Advance in Support of UL Comp, 3rd Generation Partnership Project (3GPP), Mobile Competence Centre ; 650, Route Des Lucioles ; F-06921 Sophia-Antipolis Cedex ; France, vol. RAN WG1, No. San Francisco, USA; Nov. 14, 2011-Nov. 18, 2011, Nov. 8, 2011 (Nov. 8, 2011), XP050561884, [retrieved on Nov. 8, 2011], 3 pages.
Intel Corporation: "UL CoMP Control and Signaling Principles", 3GPP Draft; R1-121525, 3rd Generation Partnership Project (3GPP), Mobile Competence Centre ; 650, Route Des Lucioles ; F-06921 Sophia-Antipolis Cedex ; France, vol. RAN WG1, No. Jeju, Korea; Mar. 26, 2012-Mar. 30, 2012, Mar. 20, 2012 (Mar. 20, 2012), XP050599798, [retrieved on Mar. 20, 2012], 5 pages.
Mexican Office Action dated Aug. 5, 2016, issued in Mexican Patent Application No. MX/a/2015/010291, 2 pages.
Korean Office Action dated Sep. 23, 2016, issued in Korean Patent Application No. 10-2015-7025802, 10 pages.
Samsung "Consideration of low-capacity/high-latency backhaul for CoMP", 3GPP TSG-RAN1 #64 meeting, R1-111103, 2011, 4 pages.

* cited by examiner

8 Scheduling unit
- 80. Joint Reception Scheduler
  - 81. UE Selector
  - 82. Cooperating Node Selector
  - 83. Radio Element Selector
  - 84. Link Adaption Selector
  - 85. Joint Reception Requester
  - 86 UE Allocator
    - 861. Message Creator
    - 862. Element Type Selector
    - 863. Message Sender
- 87 Node Reception Scheduler
  - 88. UE Allocator
  - 89. Link Adaption Selector

Fig. 8

METHODS AND NETWORK NODES FOR PERFORMING A JOINT RECEPTION IN A CELLULAR RADIO COMMUNICATION NETWORK

CROSS REFERENCE TO RELATED APPLICATION(S)

This application is a 35 U.S.C. §371 National Phase Entry Application from PCT/EP2013/054260, filed Mar. 4, 2013, designating the United States, the disclosure of which is incorporated herein in its entirety by reference.

TECHNICAL FIELD

The invention relates to cellular radio communication systems, and especially to performing a joint reception of uplink transmissions from user equipment devices.

BACKGROUND

Joint reception, or coordinated multipoint reception (CoMP), of uplink transmissions from user equipment units is a method for enhancing the reception quality of transmissions received from user equipment units. When performing a joint reception of uplink transmissions, a serving node receives user data from a user equipment unit, both directly from the user equipment unit and from another network node, a so called cooperating node, which cooperating node receives the uplink transmissions and forwards user data to the serving node.

D1 (US2011/0080879) describes coordinated multipoint (CoMP) reception of uplink signals in a cellular radio communication system (see §2). Uplink signals are received at multiple antennas by a plurality of adjacent radio access points (§4). The received uplink transmissions are subjected to a joint reception (§5). To reduce complexity during the joint processing, the system of D1 does not use all possible antennas for the reception. Instead only a subset of antennas are used (§6). Typically, the antennas where the strongest signal strengths can be expected are selected. D1 suggests measuring the downlink signals received by the user equipment in question (see claim 1 of D1).

Joint reception, as in D1 or otherwise, is beneficial in providing an enhanced reception of the uplink transmissions than single-node reception. However, joint reception requires that a cooperating node transfer user data to the serving node. Such transfer in a transport network is typically referred to as backhaul transmissions.

Since joint reception is beneficial compared to single-node reception a need to use joint reception arises. However, using the backhaul for joint reception may not always be possible since there is a risk of congestion in the backhaul links. If the backhaul is congested, the joint reception may fail or be delayed. Such congestion may not be avoided even if the number of reception points is limited, as in D1.

SUMMARY

It is an aim of the invention to alleviate the drawbacks of the prior art when performing a joint reception in a cellular radio communication system.

For this purpose the invention provides a method performed by a serving node during a process of joint reception.

The method is performed in a cellular radio communication network, and includes scheduling traffic for joint reception. The method is performed by a serving node and comprises: selecting at least one user equipment unit, selecting at least one cooperating node, and selecting at least one radio resource element. Each radio resource element consists of at least one part of the radio resources available for uplink transmissions, the available radio resource being defined by a time period comprising at least one sub-frame defining a minimum time for one transmission, and a frequency band comprising a plurality of sub-bands provided for scheduling in the cellular radio communication network.

The method of the serving node especially includes obtaining a backhaul capacity of each cooperating node, and the selection of the at least one radio resource element is based on at least one of the determined backhaul capacities. The method also includes ordering joint reception data from each selected cooperating node by transmitting at least one ordering message to each selected cooperating node, which at least one ordering message identifies each selected radio resource element, and includes allocating the selected at least one user equipment unit for uplink transmission including transmitting at least one allocating message to each allocated user equipment unit, which at least one allocating message identifies each selected radio resource element.

The invention also provides a node for a cellular radio communication network that is configured for acting as a serving node when performing a joint reception, the node being adapted for scheduling traffic for joint reception. The node comprises a user equipment selector configured to select user equipment units for joint reception, a cooperating node selector configured to select cooperating nodes for the joint reception, and a radio element selector configured to select radio resource elements for the joint reception, wherein each radio resource element consists of at least one part of the radio resources available for uplink transmissions, which available radio resource is defined by a time period comprising at least one sub-frame defining a minimum time for one transmission, and a frequency band comprising a plurality of sub-bands provided for scheduling in the cellular radio communication network.

By selecting the radio resource elements, which should be used for the joint reception, on the bases of the capacity of the backhaul, the risk for failure due to congestion of the backhaul is reduced.

The node further includes a joint reception requester configured to order joint reception data from selected cooperating nodes by transmitting ordering messages to the selected cooperating nodes, which ordering messages identifies the selected radio resource elements, and includes a user equipment allocator configured to allocate selected user equipment units for uplink transmission including configured to transmit allocating messages to allocated user equipment units, which allocating messages identifies the selected radio resource elements. The node is characterised in comprising a backhaul capacity obtainer configured to obtain a backhaul capacity of selected cooperating nodes, and in that the radio element selector is adapted to select radio resource elements based on a determined backhaul capacity.

The invention also provides a method of a cooperating node in a cellular radio communication network, which includes participating in joint reception, wherein an uplink transmission of a user equipment is received by a plurality of reception nodes, one of the reception nodes being a serving node, at least one of the reception nodes being a cooperating node, each cooperating node being provided to obtain data for joint reception from the received uplink transmission and forward the obtained data to the serving node.

The method is performed by a cooperating node and comprises: receiving an order for joint reception of at least two radio resource elements from the serving node, receiving the at least two radio resource elements, obtaining data from each received radio resource element, and forwarding the obtained data to the serving node. The method is characterized by prioritizing at least one radio resource element of the at least two radio resource elements before forwarding the obtained data, so that the data obtained from the prioritized radio resource element is forwarded before the data obtained from the other radio resource element.

The invention also provides a node configured to act as a cooperating node when performing a joint reception in a cellular radio communication network. The node is adapted to obtain data for joint reception from uplink transmission and forward the obtained data to a serving node. The node comprises an order obtainer configured to receive orders for joint reception of radio resource elements from the serving node, an uplink transmissions obtainer configured to receive the radio resource elements from user equipment units, a data obtainer configured to obtain data from received radio resource elements, and a data messenger configured to forward the obtained data to the serving node. The cooperating node is characterized in that it comprises an element prioritizing unit configured to prioritize the radio resource elements, so that the data obtained from the prioritized radio resource element is forwarded by the data messenger before the data obtained from the other radio resource element.

In a preferred embodiment, the cooperating node includes an element prioritizing unit configured to prioritize between data obtained from different the radio resource elements, which prioritization is based on the type of the radio resource elements (B1, B2) and/or an identity of the user equipment unit (UE1) in question, and/or an indication in the joint reception order that indicates priority to a specific resource element (B1, B2).

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIG. 7-9 illustrate parts of the serving node of FIG. 6 in more detail;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

A suitable cellular radio communication system for implementing the invention is a 3GPP system (3rd Generation Partnership Project), and embodiments are described in relation to the LTE standard (Long-Term Evolution). However, the invention may in similar ways be implemented in other cellular radio communication systems, such as for example GSM, TD-CDMA, and UMTS.

Figure 1:
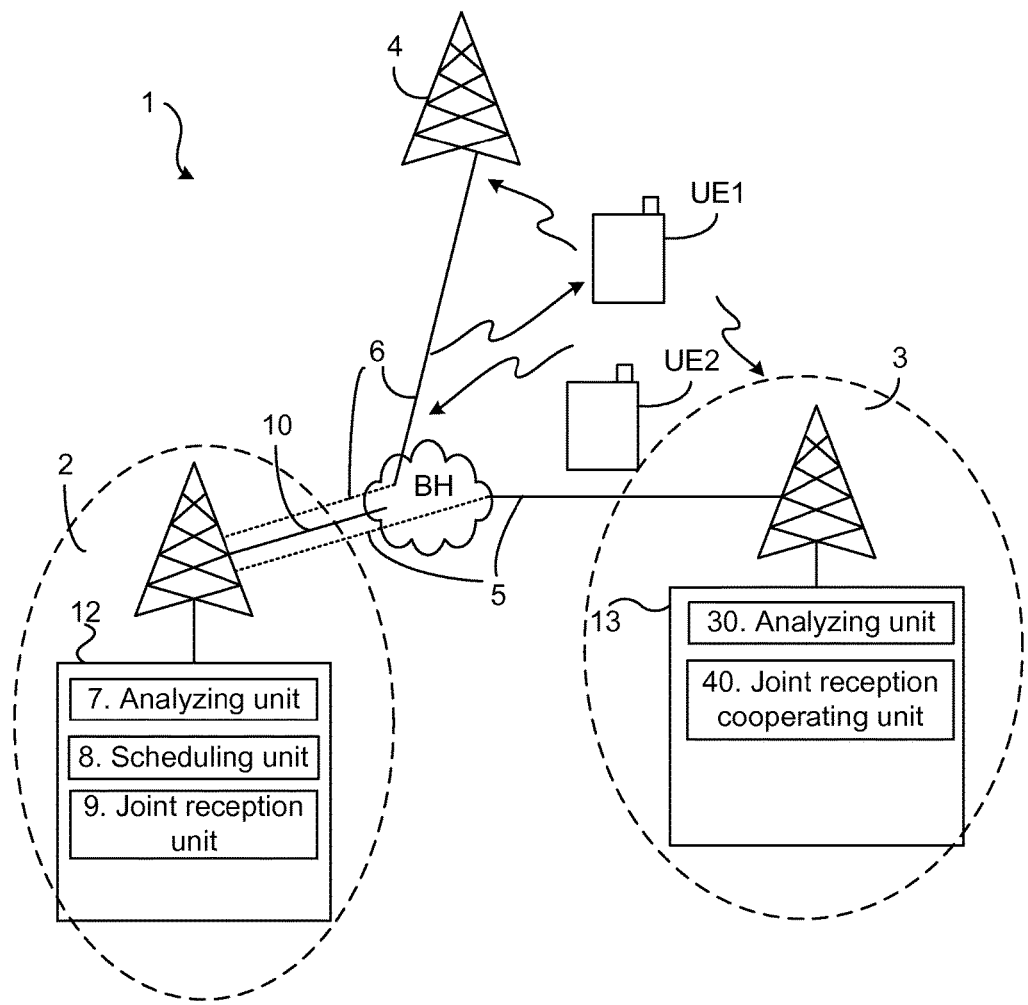
FIG. 1 illustrate parts of a cellular radio communication system, in which communication system the invention can be performed.

FIG. 1 illustrates a cellular radio communication system 1 comprising a number of network nodes (2, 3, and 4) for communicating with user equipment units UE1, UE2. During communication, one of the network nodes will serve as a serving node 2 for the user equipment units UE1, UE2, and the other network nodes (3, 4) may be used as reception nodes 3, 4 for uplink transmissions from the user equipment units UE1, UE2 and potentially be used as cooperating nodes 3 for performing a joint reception, or coordinated multipoint reception, of uplink transmissions from at least one of the user equipment units UE1, UE2. The network nodes 2, 3, 4 are interconnected by a backhaul BH comprising backhaul links 5, 6, 10. In FIG. 1, one of the reception nodes 3, 4 has been selected for joint reception and is illustrated as a cooperating node 3. The operations performed by other cooperating nodes 3 are similar and for illustrative purposes only one cooperating node 3 is included in the figure, and only one other reception node 4. The backhaul connection between the network nodes 2, 3, 4 are for illustrative purpose indicated by single links 5, 6 referred to as backhaul links 5, 6. However, in a real system the actual topology of the backhaul BH varies and includes several links and may also pass other network nodes than those illustrated. Thus, the backhaul links 5, 6 are a part of the transport network of the cellular radio communication system 1, usually comprising optical fibres, microwave communication links, electrical communication links, non-line of sight wireless links or a combination of such links. The serving node 2 is also illustrated as having a link 10 to the backhaul, in addition to the links 5, 6 to the reception nodes 3, 4, which link 10 is used for communication with other nodes (not illustrated) of the cellular radio communication system 1. The physical links 5, 6, 10 may be the same but for illustrative purposes the interconnection links 5, 6 are illustrated separately, by a dotted line, as extending between the serving node 2 and the other reception nodes 3, 4.

The serving node includes an analysing unit 7, a scheduling unit 8, and a joint reception unit 9. The joint reception unit 9 is provided for performing a joint reception of UL transmissions from the user equipment units UE1, UE2. For performing a joint reception, the joint reception unit 9 is configured to combine UL transmissions received directly from the user equipment units UE1, UE2 with data forwarded from the cooperating node 3. The cooperating node 3 includes a joint reception cooperating unit 40 configured for receiving UL transmissions from the user equipment units UE1, UE2, obtain data from the UL transmissions and forward the obtained data to the serving node 2 via the backhaul link 5.

The serving node 2 is configured to select a cooperating node 3 from the available reception nodes 3, 4 and to select user equipment units UE1 for performing the joint reception. The selection is based on the radio link quality between the user equipment units UE1, UE2 and the reception nodes 3, 4. For this purpose the serving node 2 includes an analysing unit 7 that is configured to determine the quality of the radio links, and a scheduling unit 8 provided to select a user equipment unit UE1 and one or more cooperating nodes 3 for performing the joint reception of the UL transmissions from the user equipment unit UE1.

Each potential cooperating node 3, 4 includes an analysing unit 30 configured to determine the radio link quality to the user equipment units UE1, UE2, which radio link quality may be transferred to the serving node 2 for assisting in establishing the radio link quality of the UL from the user equipment units UE1, UE2 to the potential cooperating node 3.

Also, the user equipment units UE1, UE2 include means for determining a radio link quality to the potential cooperating nodes 3, and the serving node 2 may request and receive such indications of radio link quality from the user equipment units UE1, UE2.

The serving node 2 is adapted for allocating radio resources for the joint reception on the bases of a backhaul capacity that comprises the transmission capacity of the backhaul, illustrated as a backhaul link 5, between the cooperating node 3 and the serving node 2. The backhaul capacity also comprises the capacity of the cooperating node 3 to participate in a joint reception process, such as including an indication of the current communication load experienced by the cooperating node 3, or the currently available computing capacity of the cooperating node 3.

Figure 11:
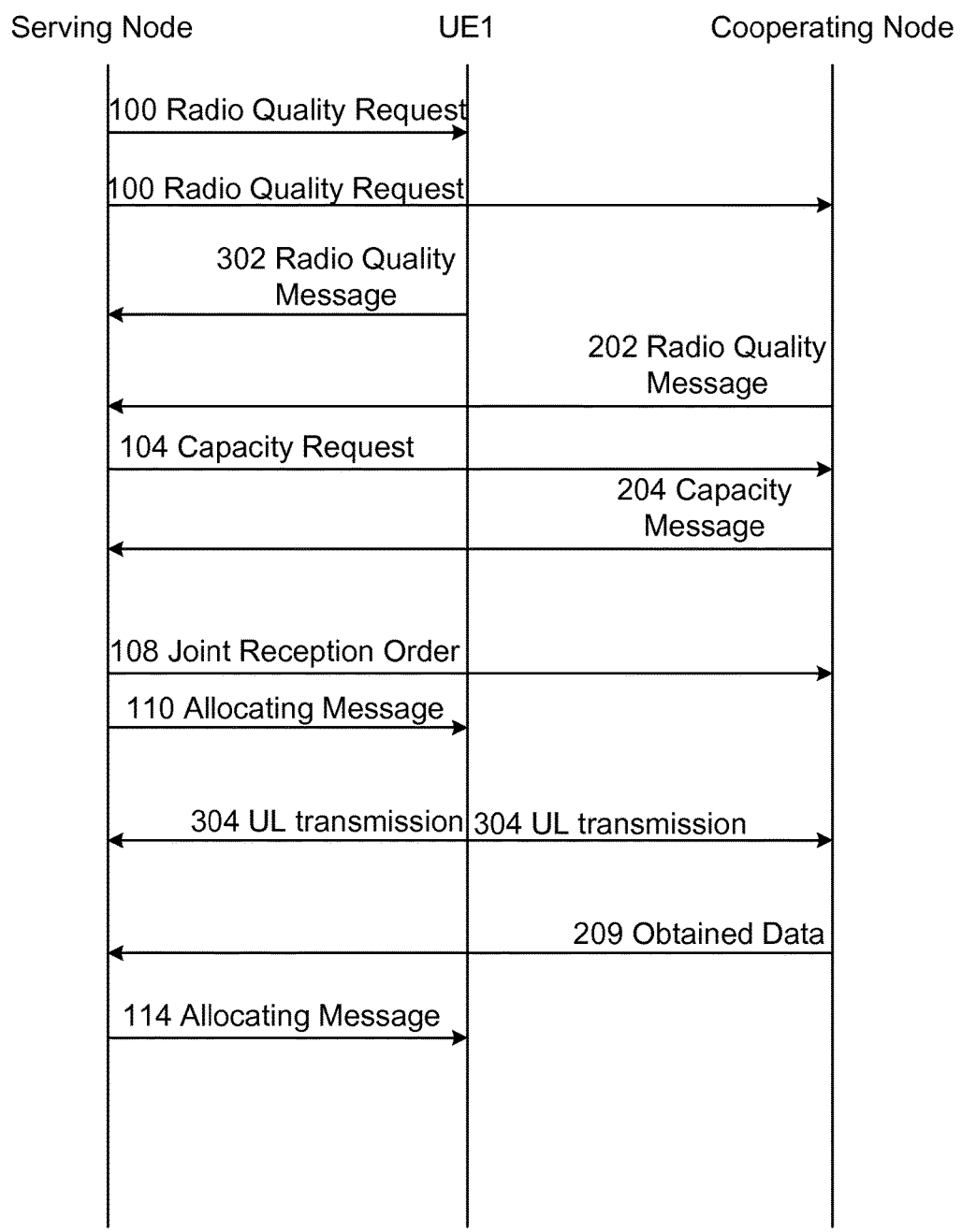
FIG. 11 is a signalling diagram illustrating exchange of signals in an embodiment of performing a joint reception.

FIG. 11 illustrates a signalling diagram between a serving node (2 in FIG. 1), a cooperating node (3 in FIG. 1), and a user equipment unit UE1, which cooperating node 3 and user equipment unit UE1 are potential units for performing a joint reception and subsequently are selected for the process of joint reception. The serving node 2 transmits 100 a radio quality request to the "potential" user equipment unit UE1, and a radio quality request to the "potential" cooperating node 3. The potential user equipment unit UE1 replies 302 by transmitting a radio quality message indicating the radio link quality to the potential cooperating node 3. The potential cooperating node 3 replies to the serving node by transmitting 202 a radio quality message, which radio quality message indicates the radio link quality to the potential user equipment unit UE1. Based on the radio quality messages, the serving node 2 may select the user equipment unit UE1 and the cooperating node 3 for joint reception. The serving node 2 may also transmit 104 a capacity request to the potential cooperating node 3 for determining the backhaul capacity for a joint reception. In such a case, the cooperating node 3 replies 204 by transmitting an indication of its capacity in a capacity message to the serving node 2, which indication may include the capacity of the cooperating node 3 for participating in a joint reception, such as including its computing capacity. Based on the radio link quality messages and the capacity message the serving node 2 selects the cooperating node 3 and the user equipment unit UE1 for the process of joint reception and selects a radio resource element that should be used by the user equipment unit UE1 and be received by the cooperating node 3. The serving node 2 transmits 108 a joint reception order to the cooperating node 3 that identifies the radio resource element of the uplink transmissions from the user equipment UE1, i.e. the uplink transmissions that should be jointly received. The serving node 2 transmits an allocating message to the user equipment unit UE1 identifying the radio resource element for the uplink transmission, the allocating message to the user equipment unit UE1 may identify both the radio resource element that should be jointly received as well as radio resources that are only received by the serving node 2 in a single-node reception. The user equipment unit UE1 transmits 304 using the allocated radio resource element, and the uplink transmissions that should be jointly received are received by both the cooperating node 3 and the serving node 2. The cooperating node 3 obtains data from the uplink transmissions and forwards the obtained data to the serving node 2, so that the serving node 2 can perform a joint reception of the directly received uplink transmissions and the uplink transmissions received via the cooperating node 3.

The serving node 2 may also schedule the user for single-node reception only in which case the serving node 2 sends 114 an allocating message to the user equipment unit UE1, without sending a corresponding joint reception order to any other reception node 3, 4.

Figure 2:
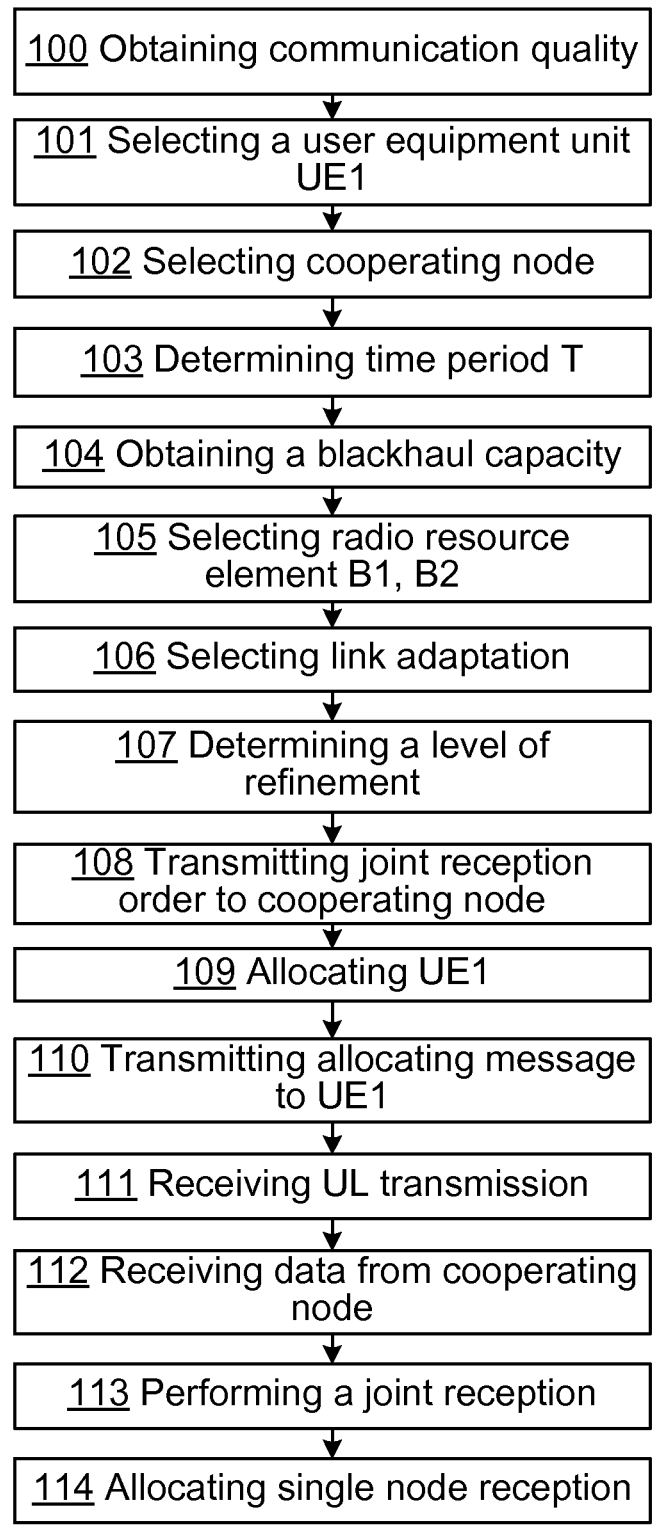
FIG. 2 is a simplified flow chart illustrating embodiments of method steps performed by the serving node.

FIG. 2 illustrates method steps being performed by a serving node 2 when selecting cooperating nodes 3 and user equipment units UE1 for performing a joint reception and method steps performed during a process of joint reception. The method starts with obtaining 100 an indication of communication quality of a radio link or interface, between a user equipment unit UE1, UE2 and at least one other node 3, 4. The obtained indication of radio link quality is used for determining the possibility of performing a joint reception, and for selecting suitable combinations of user equipment units UE1, UE2 and cooperating nodes 3, 4.

The invention can suitable be implemented in a network node already being adapted for exchanging operating data, such as radio communication quality indications, between neighboring nodes. Such indications of radio link quality may therefore already have been received and stored by the serving node 2. In such a case the serving node 2 is suitably configured to obtain an indication of radio communication quality between user equipment units UE1, UE2 and potential cooperating nodes 3, 4 by retrieving the radio communication quality indication from its own memory. If the serving node 2 is not adapted for exchanging operating data with neighboring nodes it should be adapted to obtain such data, for example by including, in the step of obtaining 100, sending a request for a radio quality indication to the user equipment unit UE1, UE2 and/or the cooperating node 3, 4.

On the basis of the radio communication quality, the serving node 2 is adapted to group user equipment units UE1, UE2 into one of two sets S1 and S2. Set S1 consists of user equipment units UE1 having a radio communication quality with a potential cooperating node 3, 4 better than a criterion. Set S2 consists of user equipment units UE2 having a radio communication quality with a potential cooperating node that is worse than the criterion. In this way the serving node 2 may store sets of user equipment units suitable for being selected for joint reception by means of a corresponding cooperating node 3.

The criterion for grouping the user equipment units into the sets S1 and S2 is in an embodiment based on for example the path loss from the user equipment unit UE1, UE2 to the cooperating node 3, 4. The criterion is in an embodiment based on the difference in path loss between the user equipment unit UE1, UE2 and the serving node 2, and between the user equipment unit UE1, UE2 and the cooperating node 3, 4. The user equipment units UE1, UE2 having the least difference, i.e. below a threshold, are grouped into set S1.

$$S_1 = \{UE_i : PL_S(UE_i) - PL_C(UE_i) < \Delta\} \quad \text{(Equation 1)}$$

where $PL_S()$ is the pathloss, in dB, on the UL or DL between the serving node (2 in FIG. 1) and user equipment number i ($UE_i$) ($UE_1$, $UE_2$ in FIG. 1), and $PL_C()$ is the pathloss between the (potential) cooperating node (3, 4 in FIG. 1) and user equipment unit i (UE1, UE2 in FIG. 1). $\Delta$ is a threshold level, which is set at least so high that a meaningful reception can be expected at the cooperating node.

In an alternative embodiment the criterion for grouping the user equipment units can be based on calculating a gain in communication quality, e.g. in dB, that the user equipment units UE1, UE2 will get if a joint reception is performed in relation to if a single-node reception is performed. Such a calculation can be made on the basis on a radio link quality report containing, in the example of LTE, a SINR (Signal-to-Noise-and Interference Ratio). For example, in LTE, a post MMSE SINR (Minimum Mean Square Error) per sub-carrier indication can be used, and if the invention is implemented in other cellular radio communication systems a similar estimation of gain can be made using the radio quality reports of the system in question. Thus, the serving node 2 is suitably configured, as described above, to obtain a radio link quality indication, or measure, to prioritize user equipment units UE1, UE2 that is likely to gain most in communication quality utilizing the limited cooperating capacity of the backhaul and the cooperating nodes 3. The estimation of a gain of a joint reception may be approximated with an estimated gain in radio link quality.

One such criterion is thus $$G_i = \{UE_i : SINR_C(UE_i) - SINR_S(UE_i) > \Delta SINR\} \quad \text{(Equation 2)}$$

where $\Delta SINR$ is a threshold, and wherein the user equipment units $UE_i$ (of the user equipment units UE1-UE2) with the highest estimated gain $G_i$ based on SINR (in dB) of a cooperating node ($SINR_C$) in relation to the SINR of the serving node ($SINR_S$) is selected to the set of user equipment units S1 being suitable for performing a joint reception with the cooperating node 3, 4 in question.

The method continues with selecting 101 a user equipment unit UE1 for joint reception, which selecting is based on the obtained radio communication quality, preferably selected from the set S1 of user equipment units UE1 that are suitable for joint reception by means of a corresponding cooperating node 3.

The selecting 101 may include selecting a plurality of user equipment units UE1 for joint reception, wherein all of the selected user equipment units UE1 belong to S1.

The method continues with selecting 102 at least one cooperating node 3, which cooperating node is, or nodes are, the cooperating node or nodes 3 that correspond to the selected user equipment unit UE1 of set S1.

The selecting 102 of the cooperating nodes 3 is based on the obtained 100 indication of radio communication quality, especially cooperating nodes 3 corresponding to the selected user equipment units UE1 of S1.

The method further includes determining 103 a time period T based on a maximum allowed latency for performing joint detection. This time period T indicates a time period during which the data for joint reception can be received still complying with requirements for delays when receiving data in the cellular radio communication network 1. The time period T can be used for determining a time window during which radio resources of the radio communication interfaces between the user equipment units UE1 and the cooperating node 3 can be used for performing one joint reception.

Figure 5A:
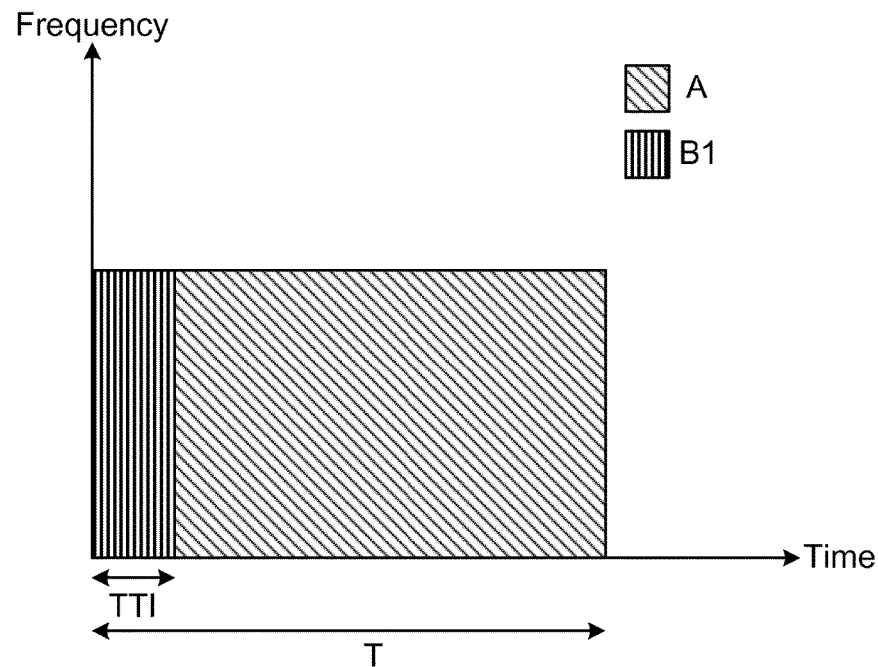
FIGS. 5a to 5b illustrate embodiments of radio resource elements in time/frequency diagrams.
Figure 5B:
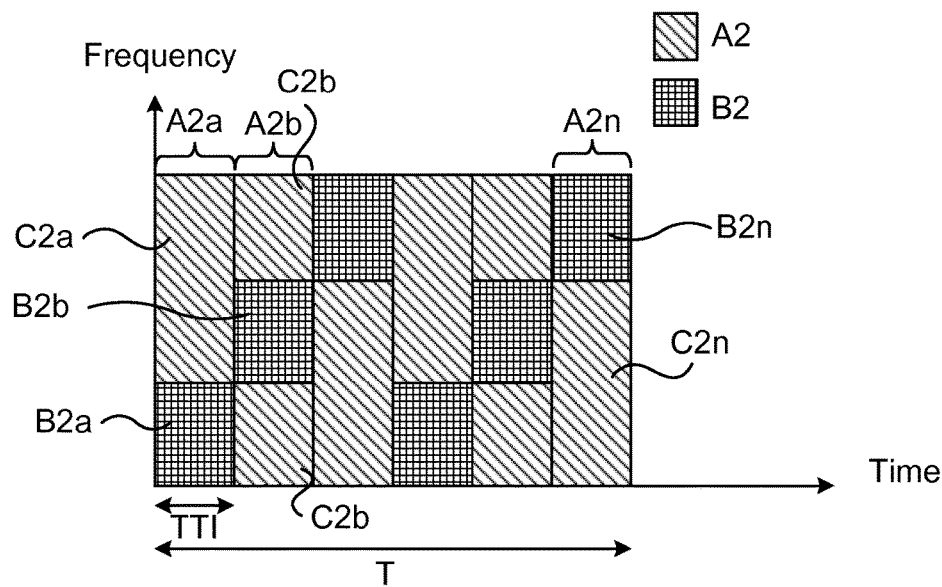

The relationship between radio resources in the cellular radio communication system 1 and the time period T is illustrated in more detail in FIGS. 5a and 5b. The radio resources consist of a frequency band which is used for transmissions during time periods comprising a minimum sub frame, or duration, referred to as TTI (transmission time interval) in LTE. The frequency band is divided in the cellular radio communication system 1 into a plurality of sub-bands.

FIGS. 5a and 5b illustrates the total radio resource A allocated to a user equipment unit UE1 during the time period T, wherein a part B1 and B2, respectively, of the total radio resource A have been selected for joint reception. FIG. 5a illustrates a situation where the total frequency band in one TTI (B1) of the time period T has been selected. FIG. 5b illustrates a situation where a number of sub-bands of the total scheduled frequency band have been selected in every TTI (B2) of the time period T.

FIG. 5a illustrates an example of a situation wherein the first sub-frame B1 allocated to one user equipment unit UE1 is allocated for joint reception. In this example, the backhaul capacity is limited to obtain data from B1 and transmit the obtained data during the whole time period T. The data obtained from the sub-frame B1 is stored in the memory of the cooperating node 3, so that it is buffered, until it can be transmitted in the backhaul link. This will induce a latency.

FIG. 5b illustrates an example of a situation wherein a part B2 of every sub-frame A2 that is scheduled to one user equipment unit UE1 is allocated for joint reception. In this example, the bandwidth of the data obtained from each sub-band B2a-n is small enough to be transmitted in the backhaul as soon as it is obtained, and in this situation no latency will be induced due to limitation in bandwidth of the backhaul. The remaining sub-bands C2a-n of the sub-frames A2a-n is also allocated to the user equipment unit UE1 but is received as single node receptions by the serving node 2.

It is easier to implement scheduling wherein the user equipment unit UE1 uses the same allocation over its total transmission, during one sub-frame, in the frequency band (A, B1, A2a-n). Since joint reception provides an enhanced reception of the transmissions, a link adaptation that allows a higher data rate can be used in the sub-frame element B1 than in the sub-band elements B2a-n where the sub-band elements C2a-n that are the subject of single-node reception are transmitted by the user equipment unit UE1 with the same link adaptation as the sub-band elements B2 subjected to the joint reception. In the example of FIG. 5a, the remaining sub-frames A, that are the subject of single-node reception by the serving node, use a link adaptation, of lower data rate, to provide a satisfying reception quality. Therefore, it may be advantageous to use sub-frame elements B1 even if latency is introduced.

The user equipment unit UE1 will, in the example of FIG. 5a, transmit during the whole period T, using a first link adaptation for the first sub-frame B1 of the frequency band, and a second link adaptation for the transmissions in the remaining sub-frames of A.

The user equipment unit UE1 will, in the example of FIG. 5b, transmit during the whole period T using the same link adaptation.

Thus, a first link adaptation scheme is used by the serving node 2 for scheduling the sub-frame B1 subjected to the joint reception, a second link adaptation scheme is used for scheduling the sub-frames A subjected to the single-node reception, and a third link adaptation scheme is used for scheduling the combined sub-frames A2a-n that are the subject both for a joint reception, i.e. the sub-band elements B2a-n, and for the single-node reception, i.e. the sub-band elements C2a-n.

The method further includes obtaining 104 a backhaul capacity of the, or each, selected cooperating node 3. The backhaul capacity can be retrieved from a memory of the serving node 2 in cases where the invention is implemented in a network node, such as a base station, already configured to exchange such data with neighboring nodes (such as 3, 4 in FIG. 1). Thus, obtaining can be performed for example by reading from the memory, obtain it from an operator or management interface, or a Self-Optimizing Network (SON) interface. Alternatively, obtaining 104 backhaul capacity includes requesting an indication of the backhaul capacity from the cooperating node 3. Also, in case the invention is implemented in a network node 2 already configured to obtain or exchange at least a part of the backhaul capacity data, such part of the backhaul capacity data can be retrieved from its memory in combination with requesting the remaining backhaul capacity data from the cooperating node 3. The backhaul capacity comprises, in a preferred embodiment: an indication of latency for communication from the cooperating node 3 to the serving node 2; and an indication of available bandwidth for sending the joint reception data on the link 5 of the backhaul from the cooperating node 3 to the serving node 2; an indication of the current load of the cooperating node 3; and an indication of computing capacity of the cooperating node 3.

The method continues with selecting 105 at least one radio resource element B1, B2 based on at least one of the determined backhaul capacities. The serving node 2 is configured to make the selection of the radio resource element B1, B2 that consists of at least one part of the radio resources A available for uplink transmissions. Returning to FIGS. 5a and 5b, the available radio resource A is defined by the time period T comprising at least one sub-frame (TTI) defining a minimum time for one transmission, and a frequency band comprising a plurality of sub-bands provided for scheduling in the cellular radio communication network 1. FIGS. 5a and 5b illustrates parts of the total radio resource A that can be selected for joint reception transmissions.

FIG. 5a illustrates an example where the backhaul capacity during time period T equals, or is larger, than the total backhaul capacity required to carry the data for joint reception of one TTI, but less than required for continuous reception during time period T. The serving node 2 is therefore adapted to allocate B1 for joint reception during the first TTI, but use the remaining part of the radio resource A either single-node reception only of the same UE1, or for other traffic, so as not to cause a congestion of the backhaul. However, allocating radio resource element B1 is not the only possibility to avoid congestion of the backhaul.

FIG. 5b illustrates a situation where the backhaul capacity during time period T equals, or is larger, than the total amount of radio resource elements B2a, B2b, . . . , B2n. Also, each radio resource element B2a, B2b, . . . , B2n is smaller than or equal to the backhaul transmission capacity during each sub frame TTI. The serving node 2 is therefore adapted to allocate the radio resource elements B2a, B2b, . . . , B2n during the time period T, wherein each radio resource element B2a, B2b, . . . , B2n is of type B2. Thus, the serving node 2 is therefore adapted to allocate B2 or B2a, B2b, . . . , B2n during the TTIs of time period T, but use the remaining part of the radio resource A2 for other traffic of the user equipment in question, i.e. traffic (using C2a-n) for single node reception, so as not to cause a congestion of the backhaul. If the available backhaul capacity is less than B1, the serving node may be configured to allocate a radio resource element B2 only during the first TTI, so as not to congest the backhaul.

Therefore, the serving node 2 is configured to use radio resource element B1, B2 being of a type selected from a group of resource elements comprising: a sub-frame element B1 consisting of at least one-sub frame of the whole frequency band; and sub-frequency element B2, B2a, B2b, . . . , B2n consisting of one sub-band in some or all sub-frames of the time period T.

As indicated above, the backhaul capacity comprises an indication of latency, and an indication of available bandwidth for sending the joint reception data on the backhaul, using a backhaul link 5 of the backhaul, and an indication of computing capacity of the cooperating node 3. If, for example, the available bandwidth of the backhaul link provides a bottle-neck for the joint reception, but the computing capacity of the cooperating node 3 is larger than required, the computing capacity can be used for reducing the bandwidth requirement of the joint reception. Therefore, the serving node 2 is adapted to consider instructing the cooperating node 3 to refine the data received in the uplink transmissions to a certain level so that the bandwidth requirements for the transmissions on the backhaul link 5 is decreased. The method therefore includes a step of determining a level of refinement 107 of the UL transmissions that should be received by the cooperating node 3 and includes an indication of a level of refinement when ordering a joint reception 108 from the cooperating node.

The method comprises selecting 106 a link adaptation. In an embodiment the link adaptation is selected from different sets of link adaptations for joint reception processes, such as using radio resource element B1 of FIG. 5, and single node reception, such as when using radio resource element A. Also, when an uplink transmission from a user equipment unit UE1 are the subject of both joint reception and single node reception, such as using radio resource elements B2a and C2a of FIG. 5b, a third link adaptation is selected, which third link adaptation is different from both the first link adaptation used for joint reception as well as the second link adaptation used for single node reception.

The method further comprises determining 107 a level of refinement on the basis of the backhaul capacity, especially a further refinement when the backhaul transmission capacity is low and the computing capacity of the cooperating node 3 is higher than needed for not performing such a refinement. The levels of refinement used are, in an embodiment, selected from a group of refinement levels including at least two of: time domain data; frequency domain (FFT) data symbols for the entire system bandwidth; user extracted frequency domain data symbols; equalized I/Q symbols; soft-bits and hard-bits.

The method further includes transmitting 108 an ordering message to each selected cooperating node. The message comprises an order, or request, of joint reception data from each selected cooperating node 3 by. The ordering message includes an identification of the, or each, selected radio resource element or elements B1, B2, B2a-B2n.

In an embodiment, the order message 108 comprises an indication of a level of refinement of the radio resource element or elements B1, B2, B2a-B2n.

The invention may suitably be implemented in cellular radio communication systems 1 wherein each user equipment unit UE1, UE2 is attended a certain quality of service level (Q o S). In such a case, the order message includes, in an embodiment, an instruction to prioritize between a plurality of radio resource elements B1, B2, wherein the prioritization corresponds to the Q o S level of the user equipment unit UE1 for which the radio resource elements B1, B2 are allocated.

The method continues with allocating 109 the selected at least one user equipment unit UE1 for uplink transmission, and with sending an allocating message 110 to the user equipment unit UE1.

In case a plurality of user equipment units UE1 have been selected for joint reception, the allocating 109 includes allocating each of the selected user equipment units UE1 to the respective radio resource element B1, B2.

If the selected user equipment units UE1 is attended a certain quality of service level (Q o S) in the cellular radio communication network, the allocating 109, may in an embodiment, include selecting a certain type of radio resource element, B1 or B2, based on the quality of service level of each selected user equipment unit UE1.

The transmitting 110 of at least one allocating message to each allocated user equipment unit UE1, comprises an allocating message that identifies each selected radio resource element B1, B2, and indicates the link adaptation. In case the uplink transmissions from the user equipment unit UE1 should both be received by the serving node 2 as a single-node reception, the allocating message identifies both the radio resource element B2 that should be jointly received as well as the radio resource element C2 that should only be received by the serving node 2, for example the allocating message identifies a radio resource element A2 that includes both the radio resource element B2 that is jointly received as well as the radio resource element C2 that is the subject of the single-node reception.

The joint reception process has then been initiated and the method continues with receiving in the uplink transmission on the radio resource elements B1, B2 in the serving node 2 directly. Data is at the same time obtained by each cooperating node 3.

The method continues with receiving 112 the obtained data from each cooperating node 3. Thus, the data that each cooperating node has obtained from the selected radio resource element B1, B2, B2a-n and forwarded by means of each respective backhaul link 5 is received in the serving node 2.

The serving node 2 then perform 113 a joint reception of the directly received uplink transmission (B1, B2) and the data from each cooperating node 3, which data has been obtained from the uplink transmissions (B1, B2). The directly received data is, during an embodiment of the joint reception, refined by the serving node 2 to the same level as refined by the cooperating node 3.

The method also includes allocating 114 user equipment units UE1, UE2 for single-node reception by means of the serving node 2 allocating on one part of the radio resources A other than the radio resource elements B1, B2 that have been selected for joint reception.

The allocating 114, of at least one user equipment unit UE1, UE2 for single-node reception only during another sub frame TTI than the sub-frame TTI selected for joint reception, may be used also for user equipment units UE1 that has also been allocated for radio resource element B1, B2 selected for joint reception. Thus, when allocating 114 user equipment units UE1, UE2 for single-node reception only, the serving node 2 is adapted to select user equipment units UE1, UE2 from S1 and S2. Alternatively, user equipment units UE2 are selected only from S2 when allocating 114 user equipment units for single-node reception.

Figure 3:
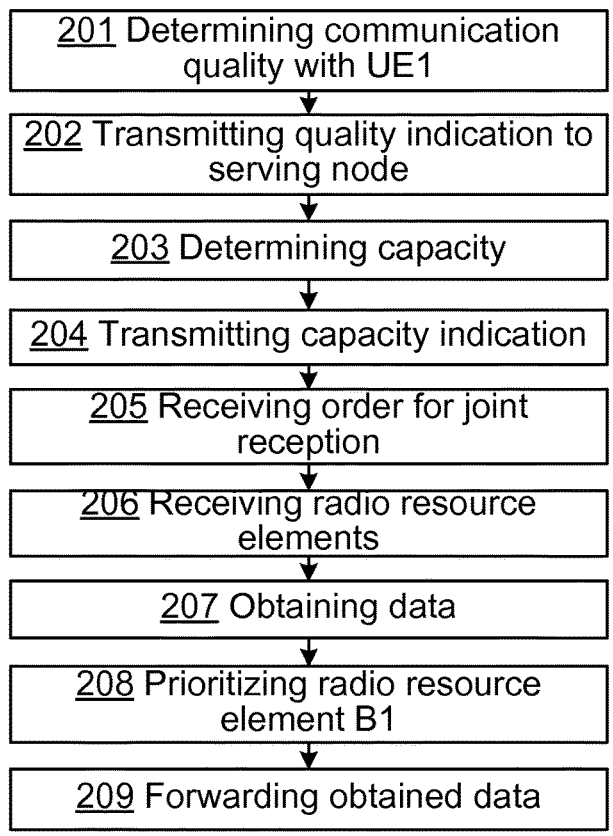
FIG. 3 is a simplified flow chart illustrating embodiments of method steps performed by a cooperating node.

FIG. 3 describes a method performed by a cooperating node 3 when participating in a joint reception process. In such a process, the uplink transmission of a user equipment unit UE1 is received by a serving node 2 and one or more cooperating nodes 3. Each cooperating node 3 could suitably be configured in accordance with these method steps. In the process, each cooperating node 3 is configured to obtain data for joint reception from the uplink transmissions, i.e. from radio resource elements B1, B2, and forward the obtained data to the serving node 2 so that the serving node 2 can perform the joint reception.

The method performed by a cooperating node 3 comprises determining 201 an indication of the radio communication quality with a user equipment unit UE1, UE2 and transmitting 202 an indication of the radio communication quality to the serving node 2. In this way, the cooperating node 3 determines a radio communication quality on the basis of uplink transmissions from the user equipment unit UE1, UE2.

It should be noted that these steps 201, 202, of determining and transmitting an indication of radio communication quality, are not necessary for performing a joint reception. As indicated with reference to FIG. 2, the radio communication quality may instead, for example, be based on measurements of the downlink performed by the user equipment units UE1, UE2, such as measuring reception levels of broadcasts of neighboring base stations 3, 4 that may be selected as cooperating nodes 3.

The method continues with determining 203 a capacity of the cooperating node for participating in the joint reception. The cooperating node 3 is in an embodiment configured to establish its current load, or its currently available computing capacity. The determining 203 of capacity includes preferably the capacity of the cooperating node 3 for receiving transmissions, obtaining data and forwarding the obtained data to the serving node 2. In this way, the serving node 2 can utilize the capacity received from the cooperating node 3 to obtain a backhaul capacity, which may also include capacity that the serving node 2 obtains from already stored data about the transmission bandwidth of the backhaul link and the computing capacity of the cooperating node 3.

The method includes transmitting 204 an indication of the capacity of the cooperating node 3 to the serving node 2. Especially, such an indication comprises an indication of latency, and/or an indication of available bandwidth for sending the obtained data on to the serving node 2 and/or an indication of computing capacity of the cooperating node 3. There are different ways of determining the backhaul capacity that is currently available for joint reception and the serving node 2 and cooperating node 3 can therefore be configured to share the processes for determining the backhaul capacity in different ways, each participating by establishing a certain part of the backhaul capacity. For example, the indication of latency may be derived from the available bandwidth of the backhaul 5, but latency and bandwidth may be independently indicated and the serving node 2 may be employed for providing the backhaul capacity without the need for the cooperating node 3 to making any such calculations or measurements. Alternatively, or in addition, other ways of obtaining an indication of the capacity for backhaul transmissions may be employed using other network functions depending on the cellular radio access system wherein the invention is implemented, for example probes in the transport network may be employed that measure the capacity of the transport network. Also, the serving node 2 may employ such probes to obtain an indication of transmission capacity without the need for requesting such an indication from the cooperating nodes 3.

The backhaul capacity indication sent from the cooperating node 3 includes in an embodiment an indication of the currently available computing capacity of the cooperating node 3. In an embodiment, the backhaul capacity indication may instead or in addition include an indication of the current traffic load of the cooperating node 3, which can be used by the serving node 2 to determine if the cooperating node 3 has additional computing capacity that may be used in the joint reception for refining the data the cooperating node 3 obtains from the uplink transmissions in the radio resource elements B1, B2.

The serving node 2 may have been able to determine the backhaul capacity from other sources than from the cooperating node 3, and the method performed by the cooperating node 3 may in such a case start with receiving an order for joint reception 205.

The receiving 205 of an order for joint reception includes an identification of at least one radio resource element B1, B2 that the cooperating node 3 should receive and obtain data from. The order may identify a plurality of radio resource elements B1, B2 from the serving node 2. The order may for example indicate a sub-band B2a that should be received during a number of TTI sub-frames, such as consecutive TTIs. The sub-band B2 may be a sub-band of the total uplink transmissions B2, C2 of the user equipment unit UE1 in case only a part of the uplink transmissions of the user equipment unit UE1 is the subject of the joint reception.

The received 205 order may suitably comprise an indication of link adaptation.

The received 205 order may also comprise an indication of a level of refinement of each resource element B1, B2, and in such a case the data of the uplink is subsequently obtained 207 to the indicated level of refinement.

The method further includes receiving 206 the radio resource element or radio resource elements B1, B2, and obtaining 207 data from each of the received radio resource elements B1, B2.

When more than one radio resource element is received for joint reception the method may further include making a prioritization 208 of at least one B2 of the at least two radio resource elements B1, B2.

In the subsequent step, the cooperating node forwards 209 the obtained data. The prioritizing is based on a priority indication in the received 205 order message. In this way the data obtained from the prioritized radio resource element B1, B2 is forwarded in the backhaul link at a higher priority than the data obtained from the other radio resource element B1, B2.

The prioritization can be implemented in the cooperating node 3 as a rule, i.e. the cooperating node 3 may be programmed to apply the prioritization in accordance with a prioritization rule, wherein a specific type of radio resource element B1, B2 is prioritized. Alternatively, or additionally, the serving node 2 may be adapted to send a prioritization instruction including an indication on which type of radio resource element B1, B2 that should be prioritized.

For the cooperating node the joint reception process continues with forwarding 209 the obtained data to the serving node 2 until all the uplink transmissions of the joint reception process have been received, refined and forwarded.

Figure 4:
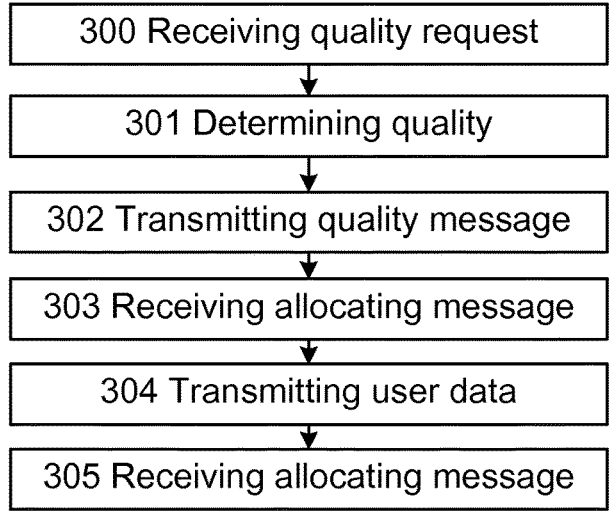
FIG. 4 is a simplified flow chart illustrating embodiments of method steps performed by a user equipment unit.

FIG. 4 illustrates method steps performed by a user equipment unit UE1 during selection of user equipment units UE1, UE2 for joint reception and being subjected to joint reception. These steps may be performed by existing user equipment units UE1, UE2, of for example an LTE system, and for performing the invention there is no need to carry out any modifications of existing user equipment units.

The method includes receiving a request for radio communication quality 300 with one or more potential cooperating nodes 3, 4. The user equipment unit UE1, UE2 determines 301 the radio communication quality with each cooperating node 3 indicated in the request. For example the user equipment unit UE1, UE2 may measure power levels of broadcasts it receives from neighboring nodes of the cellular radio communication system 1. The user equipment unit UE1, UE2 continues with transmitting 302 the determined radio communication quality. The determining 301 and transmitting 302 may be the same measures taken for the purpose of providing candidate network nodes for a handover in the cellular radio communication system 1, and may therefore be the same steps as in the handover process.

The user equipment unit UE1 receives 303 an allocating message. The allocating message identifies one, or more radio resource element B1, B2 and C2, together with an indication of a link adaptation to be used for the transmission. The method performed by the user equipment unit UE1 continues with transmitting user data and receiving 305 further allocating messages. The user equipment unit UE1 need not be conscious about which transmissions, such as using radio resource elements B1 or B2, are the subject of joint reception and which are the subject of single-node receptions, such as C2.

FIG. 5a illustrates a sub-frame element B1 consisting of at least one-sub frame and comprises the whole frequency band that is allocated to a user equipment unit UE1 during each sub-frame. Radio resource A indicates the radio resource elements available during the total time period T, wherein the first sub-frame, radio resource element B1, has been selected for a joint reception. The remaining parts, sub-frames and sub-bands, may be used for other traffic, such as single-node reception of the transmissions from the selected user equipment unit UE1. The remaining part of the radio resources A during the time period T may be used for traffic from other user equipment units. However not illustrated in FIG. 5a, the radio resource A during time period T may include a plurality of sub-frames B1 used for joint reception. Each of these sub-frames should be selected on the basis of the capacity of the backhaul so as not to overload the backhaul.

FIG. 5b illustrates sub-frequency elements B2a-n consisting of one sub-band in every sub-frame of the time period. FIG. 5b also illustrates sub-frequency elements C2a-n consisting of sub-bands in every sub-frame of the time period. Together the two types of sub-band elements B2a-n and C2a-n, respectively, make up sub-frame elements A2a-n, that constitute sub-frames allocated to a specific user equipment unit UE1. Thus, the sub-frames A2a-n are mixed sub-frames, each comprising a sub-band element B2a-n for joint reception and a sub-band element C2a-n for single-node reception.

FIGS. 6-9 illustrate a serving node 2 provided with a controller 12 according to an embodiment of the invention. The figure illustrates features needing consideration when implementing the invention in a base station and for clarity purposes a detailed description of other functions that a base station normally performs in a cellular radio communication system have been omitted. The FIGS. 6-9 illustrate a network node 2 adapted for performing the method of the serving node 2 as described in FIG. 2. For this purpose, the serving node 2 is provided with a controller 12 comprising a processor and memory which has been modified so that the serving node 2 has been configured for performing the method of the embodiments of the invention. The functions (7-9, 71-74, 80-89, 91-93, 861-863) indicated may suitably be implemented as software function that when executed by the processor of the controller 12 employing the memory controls the serving node 2 to perform the methods of the embodiments of the invention. Thus the analyzing unit 7, the scheduling unit 8 and joint reception unit 9 are illustrated as parts of the memory storing computer program code, which when executed by the controller 12 makes the serving node 2 perform the functions.

Figure 6:
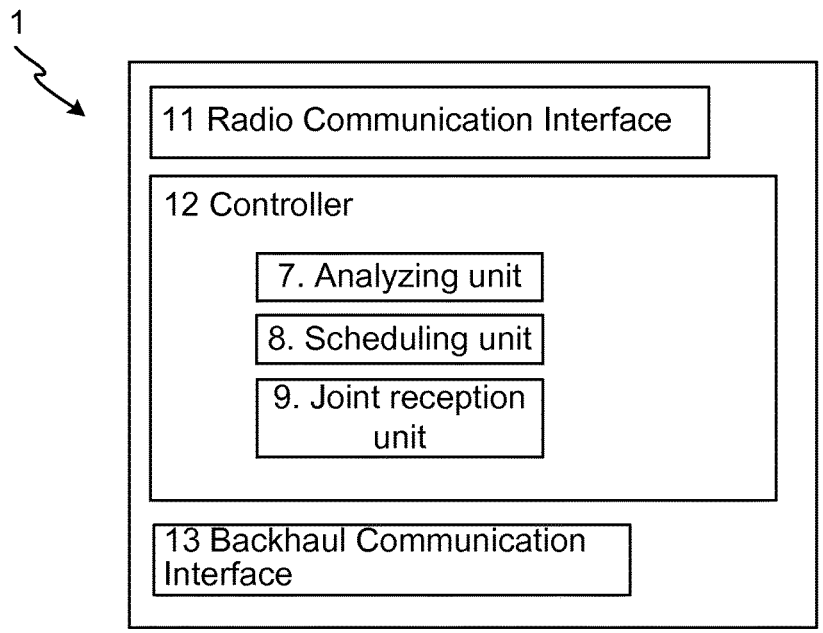
FIG. 6 illustrate parts of a serving node according to an embodiment.

FIG. 6 shows a serving node 2 comprising a radio communication interface 11 for communicating with user equipment units UE1, UE2. In the context of the invention the radio communication interface 11 is provided for receiving uplink transmission on radio resource element B1, B2 selected for a joint reception process. The radio communication interface is also provided for downlink transmissions to user equipment units UE1, UE2 and for receiving uplink transmissions from user equipment units UE1, UE2 for single-node reception, such as on radio resource elements C2 (of FIG. 5*b*) or A (of FIG. 5*a*).

The serving node 2 also comprises a backhaul communication interface 13, which in the context of the invention, especially is provided for receiving data obtained by a cooperating node 3 for the purposes of performing a joint reception. The controller 12 comprises a joint reception unit 9 configured to perform a joint reception of the uplink transmission B1, B2 received directly from the user equipment units UE1, and the data from each cooperating node 3. The joint reception unit 9 will be described in more detail with reference to FIG. 9.

The controller 12 also comprises an analyzing unit 7 and a scheduling unit 8. The analyzing unit 7 is configured for determining radio communication quality between user equipment units UE1, UE2 and other reception nodes 3, 4 and also the backhaul capacity for the purpose of a joint reception process by means of the reception nodes acting as cooperating nodes 3, 4. The analyzing unit is described in more detail in FIG. 7. The scheduling unit 8 is configured to perform a scheduling of the radio interface of the uplink transmissions from user equipment units UE1 during the joint reception process, which scheduling is based on the backhaul capacity that is obtained by the analyzing unit 7. The scheduling unit will be further described in FIG. 8.

Figure 7:
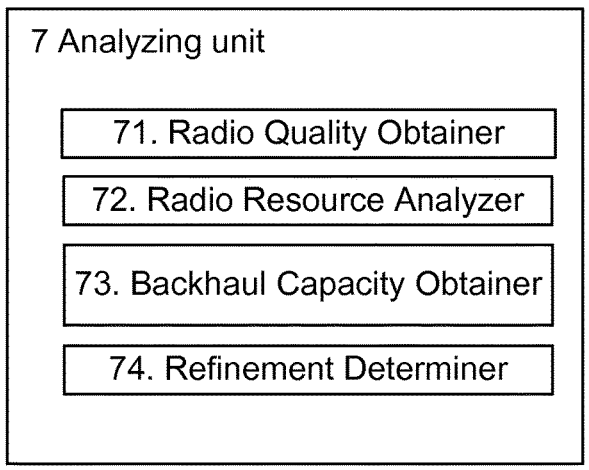

FIG. 7 illustrates the analyzing unit 7 in more detail. The analyzing unit 7 comprises a radio quality obtainer 71 configured for obtaining an indication of communication quality between user equipment units UE1, UE2 and other reception nodes 3, 4 of the cellular radio communication system 1. The radio quality obtainer 71 is adapted to obtain the radio communication quality in at least one of a number of different ways, which ways includes retrieving radio communication quality indications already stored in the memory of the controller 12, request and receive the indications of the radio communication quality from the user equipment units UE1, UE2, and request and receive the indications of radio communication quality from the other reception nodes 3, 4 that are candidates for being cooperating nodes 3 during a joint reception. The radio quality obtainer 71 is preferably adapted to group the user equipment units UE1, UE2 into sets S1, S2 of user equipment units UE1, UE2, for example in accordance with equation 1 or equation 2, wherein user equipment units UE1 having a certain radio communication quality suitable for reception by a cooperating node 3 is sorted in to a set S1. The set S1 is subsequently used when the radio resources are allocated for joint reception.

The analyzing unit 7 also comprises a radio resource analyzer 72 that are configured for analyzing the available radio resources A so that specific radio resource elements B1, B2 can be subsequently selected for a joint reception process.

The analyzing unit 7 comprises a backhaul capacity obtainer 73. The radio resource analyzer 72 is adapted to provide alternatives for allocating the radio resource elements B1, B2 on the backhaul capacity obtained by the backhaul in capacity obtainer 73. The radio resource analyzer 72 is adapted to determine a time period T of the available radio resource A, A2 based on a maximum allowed latency for performing joint detection in the cellular radio communication system 1. Further, the radio resource analyzer provides alternatives for a subsequent selecting, performed by the scheduling unit 8, which alternatives includes radio resource element B1, B2, each being determined on the basis of the available backhaul capacity, so as not to cause a congestion in the backhaul, neither in the cooperating node 3 nor in the backhaul link 5. The radio resource elements are of a type from a group of radio resource elements comprising a sub-frame element B1 consisting of at least one-sub frame of the whole frequency band being allocated to a user equipment unit UE1 during a sub-frame, and a sub-frequency element B2 consisting of a sub-band in a sub-frame A2 of the time period, wherein the remaining part of sub-frame A2 is selected for single-node reception of transmissions from the same user equipment unit UE1.

The backhaul capacity obtainer 73 is configured to obtain a backhaul capacity of selected, as selected by the scheduling unit 8, potential cooperating nodes 3.

Especially, the backhaul capacity obtainer 73 is adapted to determine a computing capacity of the cooperating node 3.

The backhaul capacity obtainer 73 is adapted to obtain a backhaul capacity of each cooperating node 3, and the backhaul capacity comprises an indication of latency, an indication of available bandwidth for sending the joint reception data on a link 5 of the backhaul and an indication of computing capacity of the cooperating node 3. The backhaul capacity obtainer 73 is configured to employ the backhaul communication interface 13 for communicating with each cooperating node 3, especially for the purpose of requesting and receiving an indication of the backhaul capacity.

The analyzing unit 7 also comprises a data refinement determiner 74, which is configured to determine a level of refinement for the joint reception data that should be obtained by each cooperating node 3. Especially, the refinement determiner 74 is configured to determine a level of refinement based on the computing capacity of the cooperating node 3, and/or load of the cooperating node 3. The refinement determiner 74 is adapted to determine a higher level of refinement on the basis of the currently available bandwidth for transmissions from the cooperating node 3 in the respective backhaul link 5 being lower than the bandwidth of the uplink traffic from user equipment units UE1 belonging to set S1, for which set S1 of user equipment units UE1 a joint reception is at least possible. In this way the serving node is adapted to match a level of refinement with backhaul bandwidth and enable an optimized utilization of the resources for performing a joint reception.

FIG. 8 illustrate the scheduling unit 8 of the serving node 2 in more detail. The scheduling unit 8 comprises a user equipment selector 81 configured to select 101 user equipment units UE1 for joint reception. The user equipment selector 81 is adapted to select the user equipment unit UE1 from the set of user equipment units S1 that have been provided by the radio quality obtainer 71. The user equipment selector 81 is adapted to select a plurality of user equipment units UE1 for joint reception, which user equipment units UE1 subsequently are allocated radio resource elements B1, B2 for joint reception in the radio interface.

Since, the user equipment selector 81 selects the user equipment units from S1, the selection is based on the radio communication quality between the user equipment units UE1 and the neighboring reception nodes, especially selected cooperating nodes 3.

The scheduling unit 8 comprises a cooperating node selector 82 configured to select cooperating nodes 3 for the joint reception. The cooperating node selector 82 is adapted to select the cooperating nodes 3 based on the obtained radio communication quality, as provided by the radio quality obtainer 71.

The scheduling unit 8 comprises a radio element selector 83 configured to select radio resource elements B1, B2 for the joint reception. Each radio resource element B1, B2 consists of at least one part of the radio resources A available for uplink transmissions. The available radio resource A are defined by a time period T comprising at least one sub-frame, or TTI (transmission time instance), preferably a plurality of sub-frames, wherein each sub-frame defines a minimum time for one transmission, and a frequency band comprising a plurality of sub-bands provided for scheduling in the cellular radio communication network 1.

The radio element selector 83 is adapted to select radio resource elements B1, B2 based on a determined backhaul capacity as provided by the backhaul capacity obtainer 73.

The radio element selector 83 being adapted to select radio resource elements B1, B2 from a group of resource element types comprising sub-frame elements B1 and sub-band elements B2. The sub-frame elements B1 consisting of at least one-sub frame of a frequency band intended for use for the total uplink transmissions from one user equipment unit UE1 during one TTI. The sub-frequency elements B2 consisting of one sub-band in one sub-frame TTI of the time period, wherein the sub-band elements B2 is a part of a sub-frame intended for use by one user equipment unit UE1. The other part C2 of the sub-frame A2 is intended for single-node reception of the transmissions from the same user equipment unit UE1.

The radio element selector 83 is, in an embodiment, adapted to select radio resource elements B1, B2 based on a quality of service provided to the user equipment unit UE1 in question. The radio element selector 83 may in such an embodiment be adapted to select the type of the radio resource elements B1, B2 based on the quality of service level of the selected user equipment UE1.

The scheduling unit further comprises a first link adaptation selector 84 configured to select link adaptation from a respective first and third set of link adaptations, which first set of link adaptations is provided for the allocation of sub-frame elements B1 for joint reception, and which third set of link adaptations is provided for the allocation of sub-band elements B2, C2, of which one of the sub-band elements are used for joint receptions, and the other for single-node reception.

The scheduling unit 8 further comprises a node reception scheduler 87 configured for scheduling single-node reception of uplink transmissions from the user equipment units UE1, UE2. The node reception scheduler 87 comprises a second link adaptation selector 89 configured to select a link adaptation for resource elements A selected for single-node reception only.

The first 84 and the second 89 link adaptation selectors are adapted to select link adaptations from respective first, second and third set of link adaptations, which first, second and third set are mutually different. Thus, the selecting of a link adaptation performed by the serving node 2 includes choosing a link adaptation for joint reception that is different from the link adaptation selected for single-node reception. In this way an expected improvement of the reception provided during the joint reception is used to provide a higher data rate in the radio interface during the joint reception. Also, the selecting of link adaptation includes selecting a link adaptation for combined or mixed transmissions, corresponding to a sub-frame A2 with sub-bands B2 and C2, that provides a data rate higher than the data rate for single-node reception and lower than the data rate used for a pure joint reception.

The scheduling unit 8 further comprises a joint reception requester 85 configured to order joint reception data by means of the backhaul communication interface 13. The joint reception requester 85 is adapted to order joint reception data from the selected cooperating nodes, as selected by the cooperating node selector 82, by creating and transmitting order messages to the cooperating nodes 3, which ordering messages identifies the selected radio resource elements. The joint reception requester 85 is adapted to indicate the determined level of refinement, as provided by the refinement determiner 74, in the ordering messages. The joint reception requester 85 is also adapted to including a prioritization indication in the order message that is based on the quality of service (Q o S) of the user equipment unit UE1 in the cellular radio communication system 1. The joint reception requester 85 is also adapted to include a prioritization indication in the order message that is based on the type of radio resource elements used for the joint reception. In alternative embodiments, such indications of prioritization may be sent by the serving node 2 to the cooperating nodes 3 separately and the joint reception requester 85 is adapted to send prioritization requests in other messages than the joint reception order. The prioritization indication can be used both for scheduling purposes and for prioritization between different messages that make use of backhaul capacity.

Prioritizations of uplink transmissions of a user equipment unit UE1 may alternatively be made independently from the quality of service level, the joint reception requester 85 is in such a case adapted to include an indication of priority based on other grounds, such as a request for prioritization from a user equipment unit UE1.

The scheduling unit 8 further comprises a user equipment allocator 86 that is configured to allocate the selected user equipment units UE1 for uplink transmission. The user equipment allocator 86 is configured to transmit allocating messages to allocated user equipment units UE1, which allocating messages identifies the selected radio resource elements B1, A2 (i.e. B2+C2), and indicates the selected link adaptation.

The user equipment allocator 86 is further adapted to select type of radio resource element, B1 or A2 (B2+C2), based on a quality of service level the selected user equipment UE1 is entitled to in the cellular radio communication network 1.

When a plurality of user equipment units UE1 have been selected for joint reception, an allocating message is sent to each of the user equipment units UE1, each including an indication of radio resource element B1, A2 including B2, and link adaptation. Based on the quality of service of each of the user equipment units UE1, the allocating message includes indications of different types of radio resource element when the quality of service level differs for the user equipment units UE1. Thus a user equipment unit UE1 having a higher quality of service level may be allocated a prioritized radio resource element B2, whereas a user equipment unit UE1 having a lower quality of service level is allocated a radio resource element B1 that is not prioritized, i.e. having a lower prioritization than the prioritized radio resource element B2.

The node reception scheduler 87 also includes a user equipment allocator 88. This second user equipment allocator 88 is configured for allocating user equipment units UE1, UE2 for single-node reception only, during a specific time sub-frame TTI.

The second user equipment allocator 88 is configured to allocate user equipment units UE1, UE2 for single-node reception by the serving node 2. The second user equipment allocator 88 is adapted to allocate the user equipment units UE1, UE2 to parts, especially sub-frames and sub-bands of sub-frames, of the radio resources A that is not selected for joint reception. The second user equipment allocator 88 is adapted to select user equipment units UE1, UE2 only from set S2 as provided by the radio quality obtainer 71. Alternatively, the second user equipment allocator 88 is adapted to select user equipment units UE1, UE2 that belong to S1 and that belong to S2.

Figure 9:
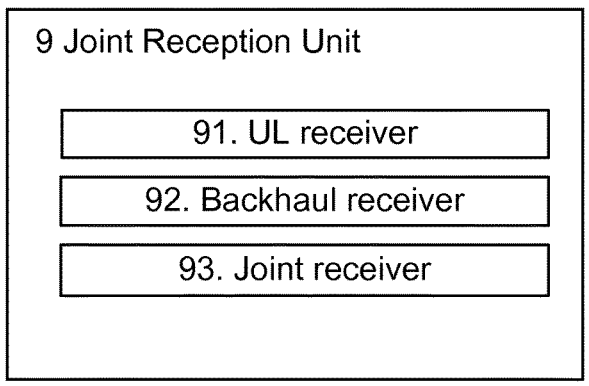

FIG. 9 illustrates the joint reception unit 9 of the serving node 2. The joint reception unit 9 comprises an uplink receiver 91 configured to receive uplink transmissions from the user equipment units UE1 by means of the radio communication interface 11. Especially, the uplink receiver is configured for receiving radio resource elements B1, B2 selected for joint reception, directly from the user equipment units UE1.

The joint reception unit 9 also comprises a backhaul receiver 92 configured to receive data by means of the backhaul communication interface 13. Especially, the backhaul receiver 92 is configured to receive data for joint reception from a cooperating node 3, as obtained from radio resource elements B1, B2 by cooperating node 3.

The joint reception unit 9 also comprises a joint receiver 93 configured to perform a joint reception of the directly received uplink transmissions and the obtained data of the uplink transmissions. Especially, the joint receiver is configured to obtain the directly received uplink transmissions to the same level of refinement as received from the cooperating node 3.

Figure 10:
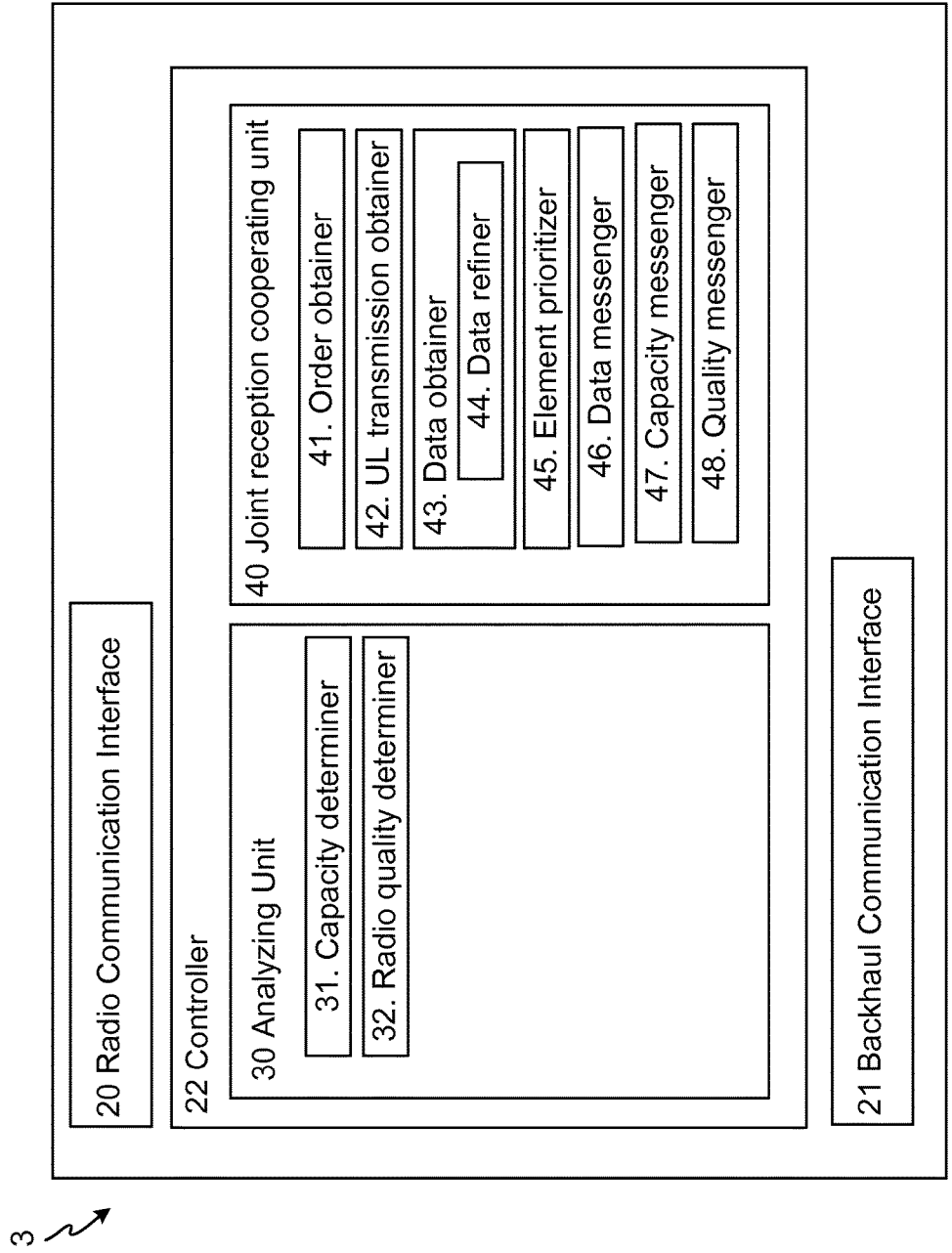
FIG. 10 illustrate parts of a cooperating node according to an embodiment

FIG. 10 illustrates a network node that has been configured to participate in a joint reception process as a cooperating node 3. The cooperating node 3 comprises a radio communication interface 20, especially for receiving uplink transmissions from user equipment units UE1 during a process of joint reception. The cooperating node 3 comprises a backhaul communication interface 21, especially for transmitting data, obtained from received uplink transmissions, to a serving node 2 when participating in a joint reception. The cooperating node 3 comprises a controller 22, especially configured to obtain data for the joint reception, which data is obtained from uplink transmissions of the user equipment units UE1 that are the subject of the joint reception. The controller 22 is illustrated as comprising a processor or controller 22 and a memory storing computer program code referred to as an analyzing unit 30 and a joint reception cooperating unit 40. The analyzing unit 30 can be seen as a computer program, which when executed by the controller 22 makes the network node perform an analysis of its radio communication quality (a program function 32) and backhaul capacity (a program function 31). The joint reception cooperating unit 40 can be seen as a computer program, which when executed by the controller 22 makes the network node perform the method steps of a joint reception process (program functions 40-48), especially performing the communication with the user equipment units UE1 by means of the radio communication interface 20, and the communication with the serving node 2 by means of the backhaul communication interface.

Thus, the network node (3) is adapted for participating in a joint reception process, wherein uplink transmissions of a user equipment UE1, UE2 is received by the network node (3) acting as a cooperating node 3 and also by a serving node 2, and wherein the cooperating node 3 is provided to obtain data for from the received uplink transmissions and forward the obtained data to the serving node 2. The cooperating node 3 is adapted for performing the method of FIG. 3 and FIG. 10 illustrates an embodiment of such a network node 3.

The analyzing unit 30 comprises a capacity determiner 31 and a radio quality determiner 32. The capacity determiner 31 is configured to determine the currently available computing capacity of the cooperating node 3 for performing a process of obtaining data from the received uplink transmissions from the user equipment units UE1. The radio quality determiner 32 is configured to provide an indication of the radio communication quality of the radio interface between the user equipment units UE1 and the cooperating node 3, so that the possibility of receiving the uplink transmissions from the user equipment unit UE1 is established.

The illustrated controller 22 comprises a capacity messenger 47 that is configured to receive a backhaul capacity request from a serving node 2 by means of the backhaul communication interface 21. The capacity messenger 47 is configured to reply to the request by transmitting an indication of backhaul capacity to the serving node 2.

The controller 22 comprises a quality messenger 48 configured for receiving a radio quality request from the serving node 2 and reply by an indication of the radio communication quality with the user equipment unit UE1, which radio quality is determined by the radio quality determiner 32. The radio quality determiner 32 is adapted determine the radio quality for example by receiving and measuring the strength of transmissions from the user equipment unit UE1.

The capacity determiner 31 is configured to determine a capacity for receiving transmissions, obtaining data and forwarding the obtained data to the serving node 2.

In a more detailed described embodiment, the capacity determiner 31 is adapted to determine a backhaul capacity that comprises an indication of latency. The latency includes the latency, or delay, for receiving uplink transmissions from a user equipment unit, obtaining data from the received uplink, and forwarding the data including latency of the transmission link between cooperating node and the serving node. The capacity determiner 31 is adapted to determine the available bandwidth of the backhaul link 5 that is currently available for sending the obtained data to the serving node 2. The capacity determiner 31 is adapted to determine, or obtain, its currently available computing capacity. The capacity determiner 31 is adapted to determine the communication load it experiences at the present time.

The joint reception cooperating unit 40 of the cooperating node 3 comprises an order obtainer 41 configured to receive orders for joint reception of radio resource elements B1, B2 from the serving node 2, by means of the backhaul communication interface 21. The order obtainer 41 is adapted for receiving orders comprising an indication of a level of refinement of each resource element B1, B2. The order obtainer 41 is adapted for receiving orders comprising an indication of prioritization of traffic from a specific user equipment unit UE1, and/or of specific resource elements B1, B2, and/or a specific type, or types, of radio resource elements B1, B2.

The joint reception cooperating unit 40 comprises an uplink transmissions obtainer 42 configured to receive the radio resource elements B1, B2 from user equipment units UE1 by means of the radio communication interface. The cooperating node 3 further comprises a data obtainer 43 configured to obtain data from received radio resource elements B1, B2, especially obtain demodulated data, despread data and decoded data. The data obtainer 43 is adapted to obtain data from each received radio resource element B1, B2 in accordance with the received joint reception orders. The data obtainer 43 comprises a data refiner 44 configured to refine obtained data in accordance with indications of a level of refinement of the received radio resource elements B1, B2 when the received orders for joint reception comprises such an indication of refinement level. Thus, the data refiner 44 is adapted to provide the data at the indicated level of refinement.

The levels of refinement that the data refiner 44 is adapted to provide comprises: time domain data; frequency domain (FFT) data symbols for the entire system bandwidth; user extracted frequency domain data symbols; equalized I/Q symbols; soft-bits and hard-bits.

The joint reception cooperating unit 40, of the cooperating node 3, comprises an element prioritizing unit 45 configured to prioritize the radio resource elements B1, B2 based on the user equipment unit UE1 transmitting the radio resource element and/or the joint reception order and/or the type of radio resource element B1, B2. The element prioritizer 45 is configured to apply a prioritization so that the forwarding of data obtained from the prioritized radio resource element B1, B2 is prioritized in relation to the data obtained from other radio resource elements B1, B2.

The joint reception cooperating unit 40 comprises a data messenger 46 for forwarding the obtained data to the serving node 2 by means of the backhaul link 5 using the communication interface 21. The data messenger 46 is adapted to forward the obtained data in accordance with the prioritization, for example the prioritization indication received from the serving node 2, and obtained by the element prioritizer 45.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method in a cellular radio communication network, including scheduling traffic for joint reception, the method being performed by a serving node and comprising:
   transmitting a first radio quality request to at least one user equipment unit (UE1);
   transmitting a second radio quality request to at least one cooperating node;
   receiving a first radio quality message from the at least one user equipment unit (UE1) in response to the first radio quality request;
   receiving a second radio quality message from the at least one cooperating node in response to the second radio quality request;
   selecting the at least one user equipment unit (UE1) based at least on the first radio quality message;
   selecting the at least one cooperating node based at least on the second radio quality message;
   selecting at least one radio resource element, each radio resource element comprising at least one part of the radio resources available for uplink transmissions, the available radio resource being defined by a time period (T) comprising at least one sub-frame defining a minimum time for one transmission (TTI), and a frequency band comprising a plurality of sub-bands provided for scheduling in the cellular radio communication network;
   obtaining a backhaul capacity of each cooperating node;
   the selection of the at least one radio resource element being based on at least one of the determined backhaul capacities;
   ordering joint reception data from each selected cooperating node by transmitting at least one ordering message to each selected cooperating node, wherein at least one ordering message identifies each selected radio resource element and
   allocating the selected at least one user equipment unit (UE1) for uplink transmission including transmitting at least one allocating message to each allocated user equipment unit (UE1), wherein at least one allocating message identifies each selected radio resource element.

2. The method according to claim 1, each selected radio resource element being of a type selected from a group of resource elements comprising:
   a sub-frame element comprising at least one-sub frame of the whole frequency band selected for transmissions from one user equipment unit (UE1); and
   a sub-frequency element comprising one sub-band of a frequency band also including a sub-band selected for single-node reception for transmissions from one user equipment unit (UE1).

3. The method according to claim 2, wherein the selecting includes selecting a plurality of user equipment units (UE1) for joint reception, and the allocating includes allocating each of the selected user equipment units (UE1) on respective selected radio resource elements.

4. The method according to claim 1, wherein the backhaul capacity comprises one or more of an indication of latency, an indication of available bandwidth for sending the joint reception data on a link of the backhaul, and an indication of computing capacity of the cooperating node.

5. The method according to claim 1, wherein the order message comprises indicating a level of refinement of each resource element and one or more of an indication of priority for transmissions in a specific resource element and transmissions from a specific user equipment unit (UE1).

6. The method according to claim 5, further comprising determining a level of refinement on the basis of the backhaul capacity, wherein the backhaul capacity includes an indication of computing capacity of the cooperating node.

7. The method according to claim 1, further comprising receiving uplink transmission on each selected radio resource element directly;
   receiving from each cooperating node the data obtained from each selected radio resource element; and
   performing a joint reception of the directly received uplink transmission and the data from each cooperating node.

8. The method according to claim 1, further comprising obtaining an indication of communication quality between a user equipment unit (UE1, UE2) and at least one other node for determining the possibility of performing a joint reception, wherein the selecting of a user equipment unit (UE1) for joint reception is based on the obtained indication of communication quality, and the selecting of at least one cooperating node is based on the obtained indication of communication quality.

9. The method according to claim 1, further comprising determining a time period (T) of the available radio resource based on a maximum allowed latency for performing joint detection.

10. A node in a cellular radio communication network configured to act as a serving node when performing a joint reception, the node being adapted for scheduling traffic for joint reception, the node comprising:
   a user equipment selector configured to select user equipment units (UE1) for joint reception;
   a cooperating node selector configured to select cooperating nodes for the joint reception;
   a radio element selector configured to select radio resource elements for the joint reception, wherein each radio resource element consists of at least one part of the radio resources available for uplink transmissions, the available radio resource being defined by a time period (T) comprising at least one sub-frame defining a minimum time for one transmission (TTI), and a frequency band comprising a plurality of sub-bands provided for scheduling in the cellular radio communication network;
   a joint reception requester configured to order joint reception data from selected cooperating nodes by transmitting ordering messages to the selected cooperating nodes, which ordering messages identifies the selected radio resource elements;
   a user equipment allocator being configured to allocate selected user equipment units (UE1) for uplink transmission including being configured to transmit allocating messages to allocated user equipment units (UE1), which allocating messages identifies the selected radio resource elements; and
   a backhaul capacity obtainer configured to obtain a backhaul capacity of selected cooperating nodes,
   the radio element selector being adapted to select radio resource elements based on a determined backhaul capacity.

11. The node according to claim 10, the radio element selector being adapted to select radio resource elements from a group of resource element types comprising:
   a sub-frame element comprising at least one-sub frame selected for transmissions from one user equipment unit (UE1); and
   a sub-frequency element comprising one sub-band of a frequency band also including a sub-band selected for single-node reception for transmissions from one user equipment unit (UE1).

12. The node according to claim 10, the backhaul capacity obtainer being adapted to determine a computing capacity of the cooperating node,
   the node further comprising a refinement determiner configured to determine a level of refinement based on the computing capacity of the cooperating node, and the joint reception requester being adapted to indicate the determined level of refinement in the ordering messages.

13. A method in a cellular radio communication network, including participating in joint reception, wherein an uplink transmission of a user equipment (UE1, UE2) is received by a plurality of reception nodes, one of the reception nodes being a serving node, at least one of the reception nodes being a cooperating node, each cooperating node being provided to obtain data for joint reception from the received uplink transmission and forward the obtained data to the serving node, the method being performed by a cooperating node and comprising:
   receiving an order for joint reception of at least two radio resource elements from the serving node;
   receiving the at least two radio resource elements;
   transmitting an indication of backhaul capacity to the serving node, which backhaul capacity comprises one or more of an indication of latency, and an indication of available bandwidth for sending the obtained data on to the serving node, and an indication of computing capacity of the cooperating node, wherein the backhaul capacity includes an indication of computing capacity of the cooperating node;
   obtaining data from each received radio resource element;
   forwarding the obtained data to the serving node; and
   prioritizing at least one radio resource element of the at least two radio resource elements before forwarding the obtained data, the data obtained from the prioritized radio resource element being forwarded before the data obtained from the other radio resource element.

14. The method according to claim 13, wherein the prioritization is based on one or more of the type of the radio resource elements and/or an identity of the user equipment unit (UE1) in question, and an indication in the joint reception order that indicates priority to a specific resource element.

15. The method according to claim 13, further comprising determining a capacity for receiving transmissions, obtaining data and forwarding the obtained data to the serving node.

16. The method according to claim 13, further comprising determining an indication of communication quality with a user equipment (UE1, UE2) and transmitting the communication quality indication to the serving node.

17. The method according to claim 13, wherein the received order comprises an indication of a level of refinement of each resource element, and obtaining data being performed to the indicated level of refinement.

18. A node configured to act as a cooperating node when performing a joint reception in a cellular radio communication network, the node being adapted for obtaining data for joint reception from uplink transmission and forward the obtained data to a serving node, the node comprising:
   an order obtainer configured to receive orders for joint reception of radio resource elements from the serving node;
   an uplink transmissions obtainer configured to receive the radio resource elements from user equipment units (UE1);

a capacity messenger configured to transmit an indication of backhaul capacity to the serving node;

comprising a capacity determiner configured to determine a capacity for receiving transmissions, obtaining data and forwarding the obtained data to the serving node, and the capacity messenger being adapted to indicate backhaul capacity based on the determined capacity;

a data obtainer configured to obtain data from received radio resource elements;

a data messenger configured to forward the obtained data to the serving node and an element prioritizing unit configured to employ a prioritization of the radio resource elements, the data obtained from the prioritized radio resource element being forwarded by the data messenger before the data obtained from the other radio resource element.

19. The node according to claim 18, further comprising a data refiner configured to refine obtained data in accordance with indications of a level of refinement for the resource elements when received orders for joint reception comprises such an indication.

20. The node according to claim 18, wherein the element prioritizing unit is adapted to make the prioritization on the basis of one or more of the type of the radio resource elements, an identity of the user equipment unit (UE1) in question, and an indication in the joint reception order that indicates priority to a specific resource element.

* * * * *